US009846352B2

(12) United States Patent
Terasaki et al.

(10) Patent No.: US 9,846,352 B2
(45) Date of Patent: Dec. 19, 2017

(54) LIGHT SOURCE APPARATUS, LIGHT SOURCE UNIT, AND IMAGE DISPLAY APPARATUS

(71) Applicant: SONY CORPORATION, Tokyo (JP)

(72) Inventors: Kazuya Terasaki, Shizuoka (JP); Daisuke Ogawa, Aichi (JP)

(73) Assignee: SONY CORPORATION, Tokyo (JP)

( * ) Notice: Subject to any disclaimer, the term of this patent is extended or adjusted under 35 U.S.C. 154(b) by 307 days.

(21) Appl. No.: 14/615,833

(22) Filed: Feb. 6, 2015

(65) Prior Publication Data

US 2015/0263486 A1    Sep. 17, 2015

(30) Foreign Application Priority Data

Mar. 11, 2014   (JP) ................................. 2014-047131

(51) Int. Cl.
*G03B 21/20* (2006.01)
*G03B 21/14* (2006.01)
*H04N 9/31* (2006.01)

(52) U.S. Cl.
CPC ....... *G03B 21/2033* (2013.01); *G03B 21/145* (2013.01); *H04N 9/3161* (2013.01)

(58) Field of Classification Search
CPC ... G03B 21/2033; G03B 21/14; H01S 5/0216; H01S 5/02469; H01S 5/06817
USPC ............................................... 353/30; 372/72
See application file for complete search history.

(56) References Cited

U.S. PATENT DOCUMENTS

| 7,967,452 | B2* | 6/2011 | Itoh ........................ G03B 21/14 353/119 |
| 2013/0070215 | A1* | 3/2013 | Higo .................... G03B 21/204 353/85 |
| 2015/0216018 | A1* | 7/2015 | Newton ............. H05B 37/0227 315/153 |

* cited by examiner

*Primary Examiner* — Steven H Whitesell Gordon
*Assistant Examiner* — Jerry Brooks
(74) *Attorney, Agent, or Firm* — Oblon, McClelland, Maier & Neustadt, L.L.P.

(57) ABSTRACT

Disclosed is a light source apparatus including a light source part having a lead and a light emitting part for emitting light with a current from the lead; a substrate having a wiring part electrically connected to the lead for supplying a current to the lead; a base part having a first surface connected to the light source part, a second surface which is connected to the substrate and located on a side opposite to the first surface, and a through-hole penetrating through the first and second surfaces, in which the lead is inserted; and a vibration suppression mechanism including a vibration suppression part having a side wall portion inserted to the through-hole in such a manner that the side wall portion surrounds the lead, the vibration suppression part being connected to the substrate, and a fixing part for fixing the lead to the side wall portion.

16 Claims, 15 Drawing Sheets

LIGHT SOURCE APPARATUS, LIGHT SOURCE UNIT, AND IMAGE DISPLAY APPARATUS

CROSS REFERENCE TO RELATED APPLICATIONS

This application claims the benefit of Japanese Priority Patent Application JP2014-047131 filed Mar. 11, 2014, the entire contents of which are incorporated herein by reference.

BACKGROUND

The present disclosure relates to a light source apparatus, a light source unit, and an image display apparatus using the light source apparatus or the light source unit.

Image display apparatuses such as projectors have been widely used from the past. In a projector, for example, light from a light source is modulated by a light modulation element such as a liquid crystal element; and the modulated light is projected on a screen or the light, to display an image. Examples of light sources that can be used include a mercury lamp, a xenon lamp, a light-emitting diode (LED), a laser diode (LD) and the like. Among these light sources, solid-state light sources such as LEDs and LDs have advantages such as having long lifetime, no replacement of lamps, which is necessary in related art, and lighting-up immediately after power-on.

However, in cases where an LD or the like is used as the light source, vibrations due to magnetostriction in a lead-pin connected to a laser element may be a problem. That is, in cases where a magnetic material is used as a lead-pin, magnetostriction may be caused when a current is applied to the lead-pin. As a result, a sound produced by the vibration may become noise. For example, a technique disclosed in International Publication No. WO 2011/092735 is addressed to preventing breakage and noise due to deformation by magnetostriction that may be caused by the current applied to the lead-pin.

SUMMARY

Thus, there have been a demand for techniques to suppress noise or the like caused by magnetostriction in lead-pins.

In view of the circumstances as described above, it is desirable to provide a light source apparatus, a light source unit, and an image display apparatus using any of them, which are capable of suppressing noise or the like which might be caused by magnetostriction in a lead-pin.

According to an embodiment of the present disclosure, there is provided a light source apparatus including a light source part, a substrate, a base part a vibration suppression mechanism.

The light source part has a lead and a light emitting part configured to emit light with a current from the lead.

The substrate has a wiring part electrically connected to the lead. The wiring part is configured to supply a current to the lead.

The base part has a first surface connected to the light source part and a second surface connected to the substrate. The second surface is located on a side opposite to the first surface. The base part has a through-hole penetrating through the first surface and the second surface. In the through-hole, the lead is inserted.

The vibration suppression mechanism includes a vibration suppression part having a side wall portion. The side wall portion is inserted to the through-hole in such a manner that the side wall portion surrounds the lead. The vibration suppression part is connected to the substrate. The vibration suppression mechanism includes a fixing part configured to fix the lead to the side wall portion.

This light source apparatus includes the vibration suppression mechanism, including the side wall portion surrounding the lead and the fixing part fixing the lead to the side wall portion. This makes it possible to suppress the noise or the like which might be caused by magnetostriction in a lead-pin.

The fixing part may be a liquid fixing material provided between the lead and the side wall portion.

By providing the liquid fixing material, it is possible to easily fix the lead to the side wall portion.

The side wall portion may be arranged in such a manner that a capillary force between the side wall portion and the lead can be applied to the fixing material.

This allows it to sufficiently provide fixing material, and thus to sufficiently fix the lead to the side wall portion.

The side wall portion may have at least one opening.

This may make it possible to sufficiently apply the capillary force to the fixing material.

The side wall portion may have a meshed portion.

This may also make it possible to sufficiently apply the capillary force to the fixing material.

The side wall portion may have a coiled shape.

This may also make it possible to sufficiently apply the capillary force to the fixing material.

The side wall portion may be inserted to the through-hole in such a manner that the side wall portion and an inner circumferential surface of the through-hole are spaced from each other.

This allows it to sufficiently secure electrical isolation between the side wall portion and the base part.

The fixing material may electrically connect the lead and the wiring part.

In such a manner, the connection between the lead and the wiring part as well as the fixation between the lead and the side wall portion may be made with the fixing material. This may increase the ease of assembly of the light source apparatus.

The vibration suppression part may have a flange portion coupled to the side wall portion, the flange portion being made in contact with the substrate.

By providing the flange portion, it makes it possible to sufficiently fix the vibration suppression part to the substrate. This may sufficiently suppress the noise or the like which might be caused by magnetostriction in a lead-pin.

The fixing material may fix the flange portion onto the substrate.

The fixing material may be used for the fixation of the flange portion to the substrate. This may increase the ease of assembly of the light source apparatus.

The fixing material may include a solder.

By using the solder, it becomes possible to increase the ease of assembly of the light source apparatus.

The base part may include a heat dissipation member capable of releasing heat of the light source part.

This makes it possible to sufficiently reduce the effect of heat produced by the light source part.

According to another embodiment of the present disclosure, there is provided a light source unit including the light source part, the substrate, the base part and the vibration suppression mechanism.

According to still another embodiment of the present disclosure, there is provided an image display apparatus including the light source apparatus, an image generation system and a projection system.

The image generation system includes an image generation element and a lighting optical system. The image generation element is configured to generate an image based on applied light. The lighting optical system is configured to apply the light from the light source apparatus to the image generation element.

The projection system is configured to project the image generated by the image generation element.

Thus, according to the present disclosure, it is possible to suppress the noise or the like which might be caused by magnetostriction in a lead-pin. Note that the effects described above are only for illustration and any effect described in the present disclosure may be produced.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment according to the present disclosure will be described with reference to the drawings.

Image Display Apparatus

Figure 1:
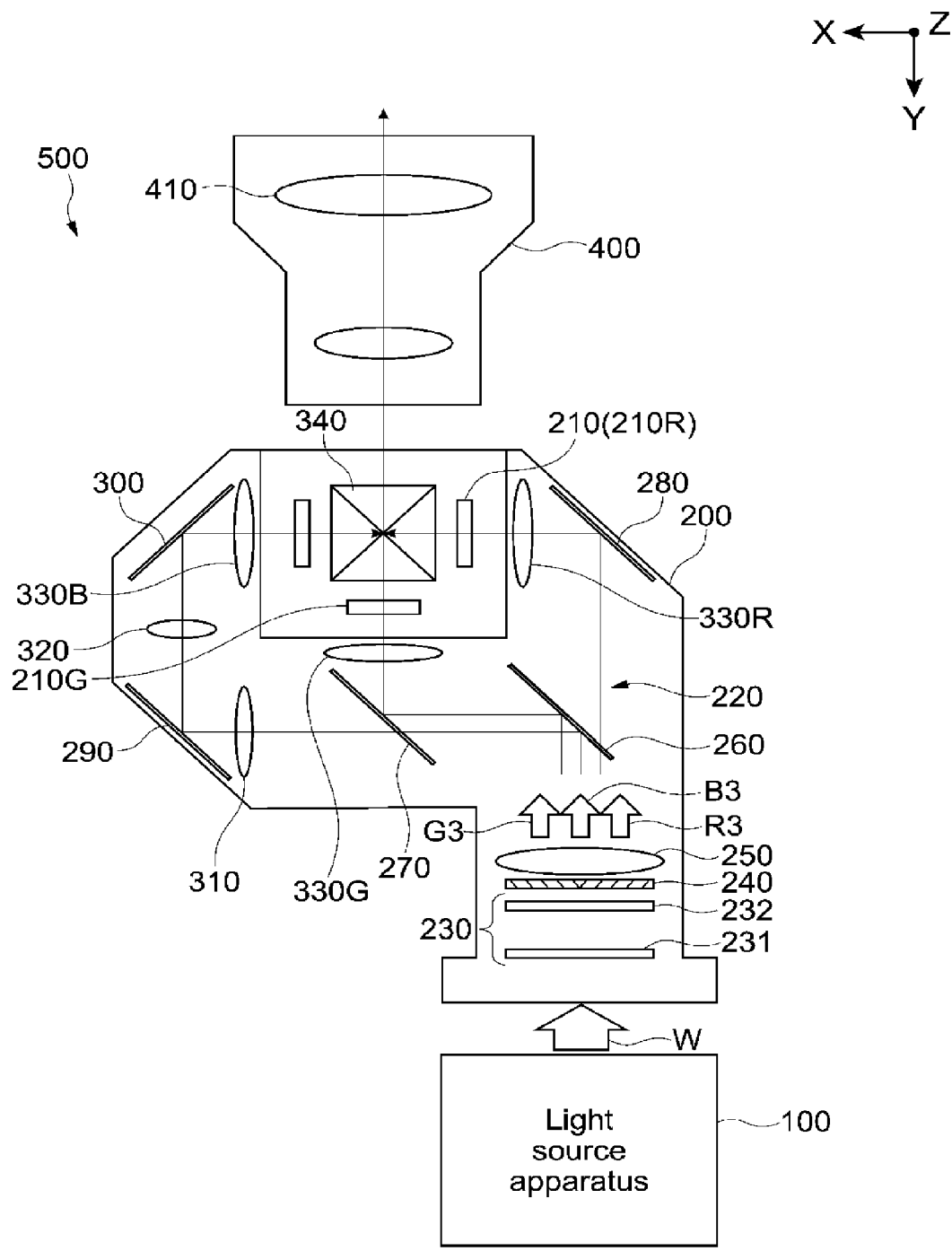
FIG. 1 is a schematic diagram showing a configuration example of an image display apparatus according to an embodiment of the present disclosure.

FIG. 1 is a schematic diagram showing a configuration example of an image display apparatus according to an embodiment of the present disclosure. For example, an image display apparatus 500 is used as a projector for presentations, or for digital cinemas. The present disclosure described herein may be applied to image display apparatuses for these and other uses.

The image display apparatus 500 has a light source apparatus 100 capable of emitting white light; an image generation system 200 which generates an image based on the light from the light source apparatus 100; and a projection system 400 which projects the generated image on a screen (not shown).

The light source apparatus 100 emits white light W including red light, green light and blue light. The detail of the light source apparatus 100 will be described later.

The image generation system 200 includes an image generation element 210 and a lighting optical system 220. The image generation element 210 generates an image based on applied light. The lighting optical system 220 applies output light coming from the light source apparatus 100 to the image generation element 210. The image generation system 200 further includes an integrator element 230, a polarization conversion element 240, and a light collecting lens 250.

The integrator element 230 includes a first fly-eye lens 231 and a second fly-eye lens 232. The first fly-eye lens 231 includes a plurality of microlenses two-dimensionally arranged. The second fly-eye lens 232 includes a plurality of microlenses that are arranged to correspond to the respective microlenses of the first fly-eye lens 231.

The white light W that enters the integrator element 230 from the light source apparatus 100 is split into a plurality of light fluxes by the microlenses of the first fly-eye lens 231 to form images on the corresponding microlenses of the second fly-eye lens 232. The microlenses of the second fly-eye lens 232 each function as a secondary light source and apply a plurality of parallel light beams with the same luminance to the polarization conversion element 240 as incident light.

The integrator element 230 has a function of trimming the incident light to be applied to the polarization conversion element 240 from the light source apparatus 100 so as to have a uniform luminance distribution as a whole.

The polarization conversion element 240 has a function of making a polarization state of incident light uniform, the incident light being input via the integrator element 230 and the like. For example, the polarization conversion element 240 outputs white light including blue light B3, green light G3, and red light R3 via the light collecting lens 250 and the like arranged on the output side of the light source apparatus 100.

The lighting optical system 220 includes dichroic mirrors 260 and 270, mirrors 280, 290, and 300, relay lenses 310 and 320, field lenses 330R, 330G, and 330B, liquid crystal light valves 210R, 210G, and 210B serving as the image generation element, and a dichroic prism 340.

The dichroic mirrors 260 and 270 have property of selectively reflecting light of color in a predetermined wavelength range and transmitting light in the other wavelength range. With reference to FIG. 1, for example, the dichroic mirror 260 selectively reflects the green light G3 and the blue light B3. The dichroic mirror 270 selectively reflects the green light G3 out of the green light G3 and the blue light G3 reflected by the dichroic mirror 260. The remaining blue light B3 passes through the dichroic mirror 270. Thus, the light output from the light source apparatus 100 is split into a plurality of light beams with different colors. Note that the configuration for splitting light into a plurality of color light beams and the device to be used therefor is not limited to the above.

The split red light R3 is reflected on the mirror 280, converted into parallel light by passing through the field lens 330R, and then input into the liquid crystal light valve 210R for modulation of red light. The green light G3 is converted into parallel light by passing through the field lens 330G and then input into the liquid crystal light valve 210G for modulation of green light. The blue light B3 passes through the relay lens 310 and is reflected on the mirror 290, and further passes through the relay lens 320 and is reflected on the mirror 300. The blue light B3 reflected on the mirror 300 is converted into parallel light by passing through the field lens 330B, and then input into the liquid crystal light valve 210B for modulation of blue light.

The liquid crystal light valves 210R, 210G, and 210B are electrically connected to a signal source (for example, personal computer (PC)) (not shown) that supplies an image signal containing image information. The liquid crystal light valves 210R, 210G, and 210B modulate the input light for each pixel based on supplied image signals of the respective colors, and generate a red-color image, a green-color image, and a blue-color image, respectively. The modulated light of each color (formed image) is input into the dichroic prism 340 to be combined. The dichroic prism 340 superposes and combines the light beams of the respective colors that are input from the three directions, and then outputs the combined light toward the projection system 400.

The projection system 400 projects the image generated by the image generation element 210. The projection system 400 includes a plurality of lenses 410 and the like and applies the light combined by the dichroic prism 340 onto a screen or the like (not shown). Thus, a full-color image is displayed.

Figure 2:
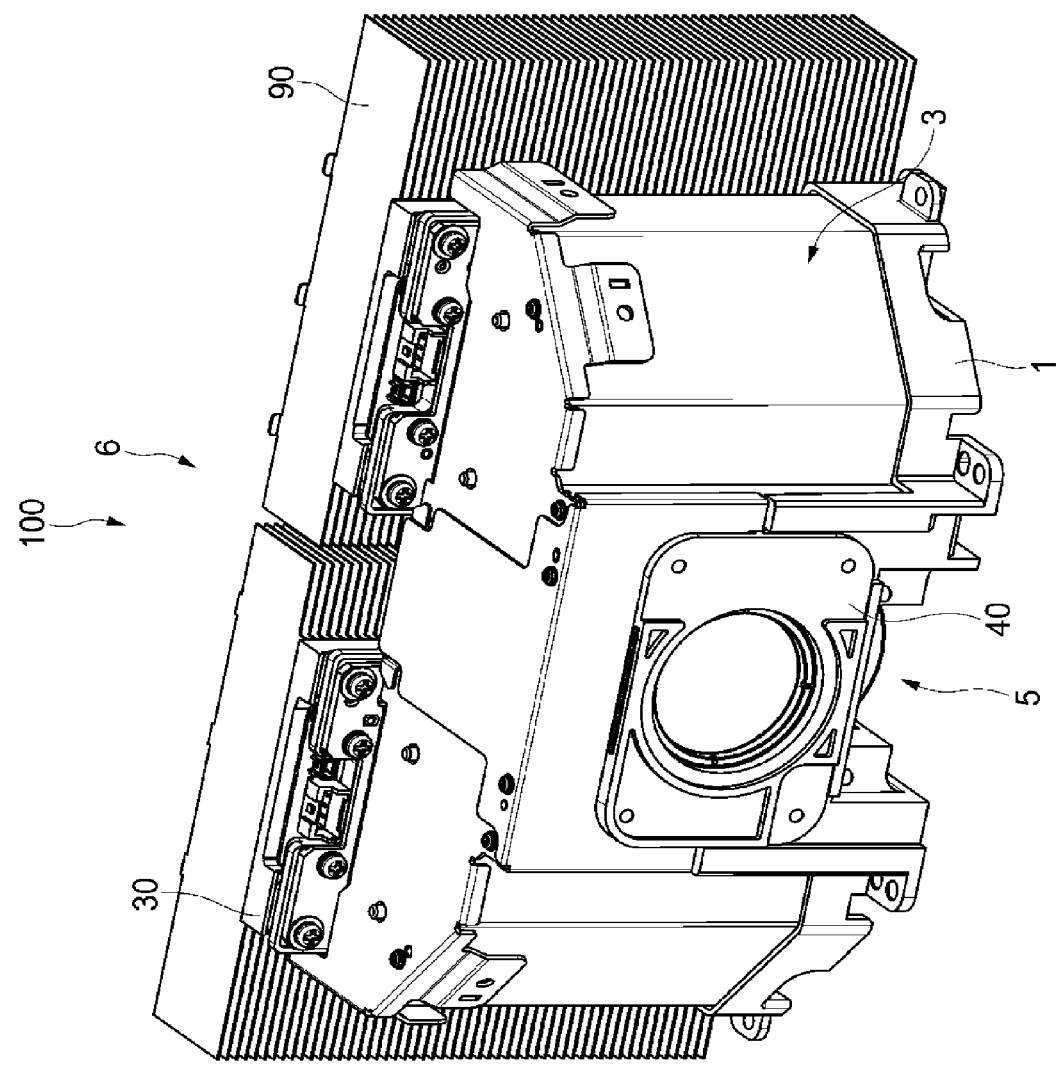
FIG. 2 is a perspective view showing a configuration example of a light source apparatus.
Figure 3:
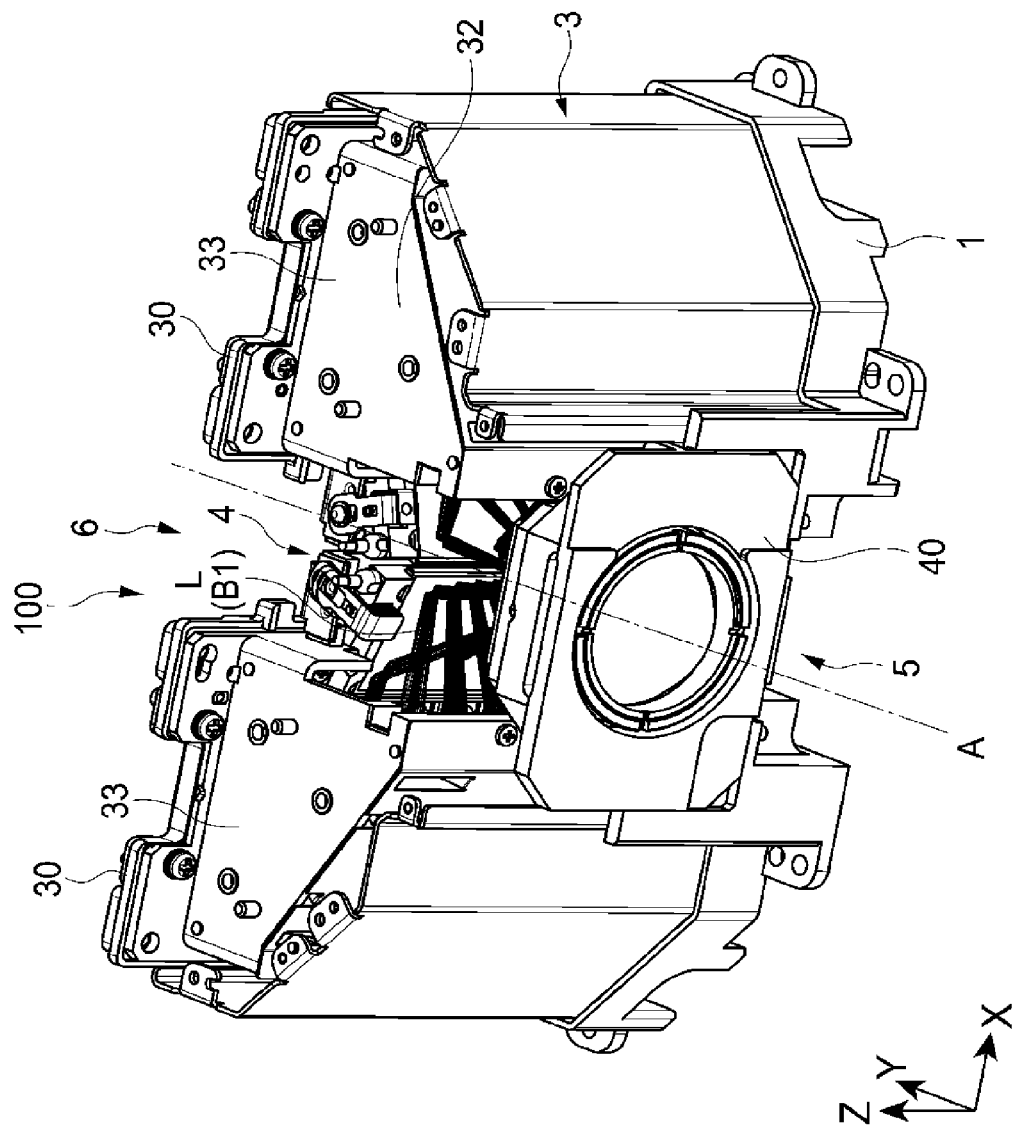
FIG. 3 shows the light source apparatus shown in FIG. 2 from which a part of the superior surface is removed.

FIG. 2 is a perspective view showing a configuration example of the light source apparatus 100. FIG. 3 shows the light source apparatus 100 shown in FIG. 2 from which a part of the superior surface is removed. In FIG. 3, illustration of a heat sink 90 shown in FIG. 2 is omitted.

Figure 4:
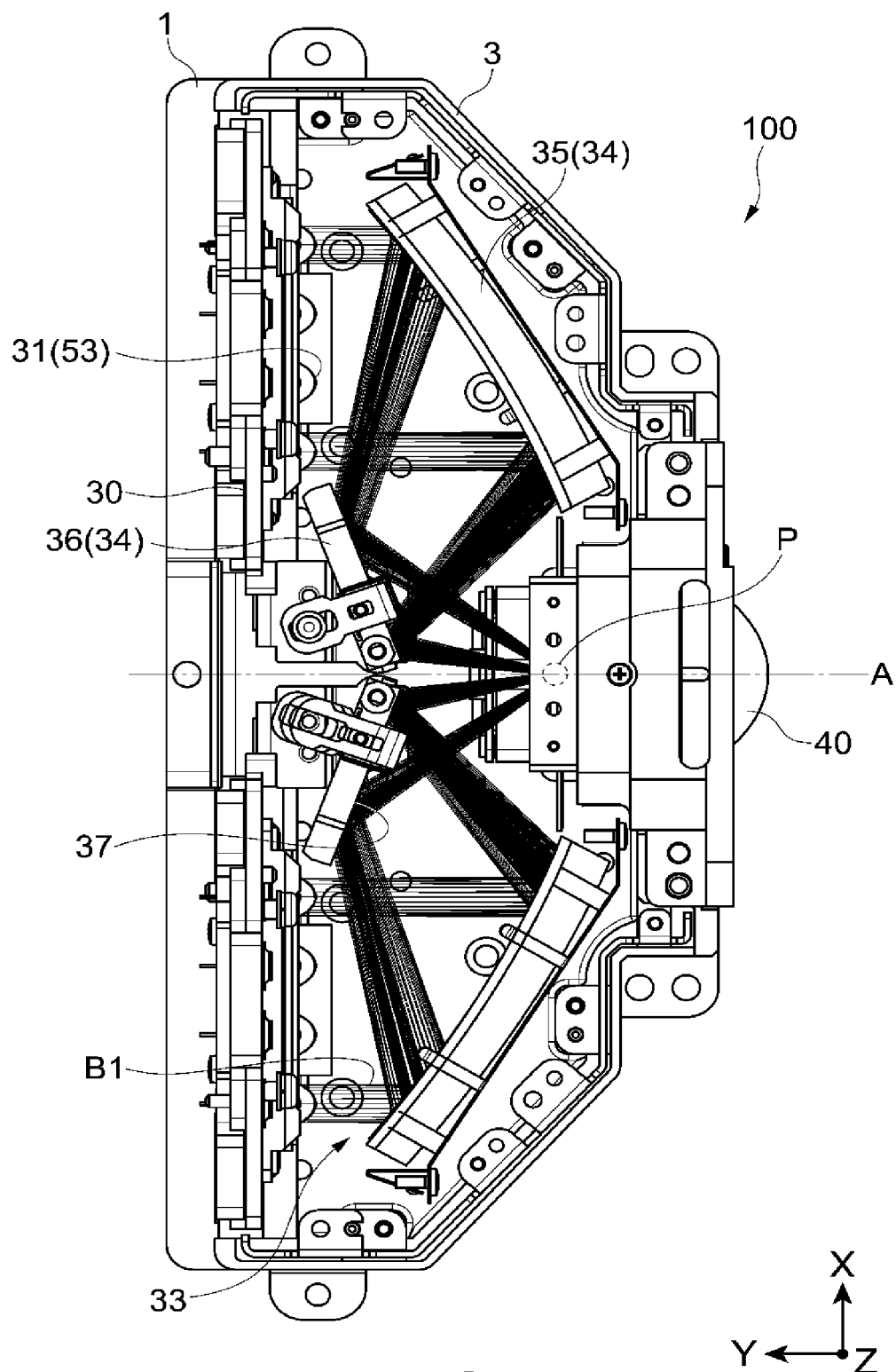
FIG. 4 is a plan view of the light source apparatus shown in FIG. 3, viewed from above.

The light source apparatus 100 combines laser light in a blue wavelength range with light in red and green wavelength ranges, the light being generated from a fluorescent substance excited by the laser light in the blue wavelength range, to output white light. As shown in FIG. 2, the light source apparatus 100 includes a base 1 and a chassis part 3. The base 1 is provided to a bottom portion of the light source apparatus 100. The chassis part 3 is supported by the base 1. A light source unit 30 and a phosphor unit 40 are mounted on the base 1. The light source unit 30 has at least one solid-state light source. The phosphor unit 40 receives light from the light source unit 30, generates white light, and emits the white light. As shown in FIG. 4, in a space 4 inside the chassis part 3, output light L from the light source unit 30 is applied to the phosphor unit 40.

The base 1 has a generally planar and elongate shape extending in one direction. A longitudinal direction of the elongated base 1 is a horizontal direction of the light source apparatus 100, and a short-side direction perpendicular to the longitudinal direction is a front-back direction thereof. Therefore, one of two longitudinal portions that are opposed to each other in the short-side direction is a front side 5, and the other of the longitudinal portions is a rear side 6. Further, a direction perpendicular to both the longitudinal direction and the short-side direction is a height direction of the light source apparatus 100. In an example shown in FIG. 1, an x-axis direction, a y-axis direction, and a z-axis direction correspond to the horizontal direction, the front-back direction, and the height direction, respectively.

As shown in FIG. 3, two light source units 30 are arranged side by side in the longitudinal direction on the rear side 6 of the base 1. Each light source unit 30 has a plurality of laser light sources (laser diodes) 31, which serves as the at least one solid-state light source, capable of outputting blue laser light B1 (see FIG. 4). The plurality of laser light sources 31 is arranged in such a manner that the blue laser light B1 is emitted toward the front side 5 along a direction of its optical axis in the front-back direction.

In front of each of the two light source units 30, a corresponding light collecting optical system is disposed. The light collecting optical system collects the blue laser light B1, which is output light from the plurality of laser light sources 31, to a predetermined point. In FIG. 3, a support portion 32 in front of the light source units 30 is illustrated. The support portion 32 is a member that supports the light source units 30 and the light collecting optical systems, so that they make up one unit. With this support portion 32, a light collecting unit 33, which includes the light source units 30 and the light collecting optical systems, is made up.

The blue laser light B1 collected by this light collecting unit 33 is used as excitation light, and as a result, from the phosphor unit 40, white light is emitted along an optical axis A. The optical axis A extends along substantially the same direction as the direction of the optical axis of the blue laser light B1 output from the plurality of laser light sources 31. That is, the phosphor unit 40 is arranged on the front side 5 of the base 1 in such a manner that the white light can be emitted in substantially the same direction as the direction of the optical axis of the blue laser light B1.

Figure 5:
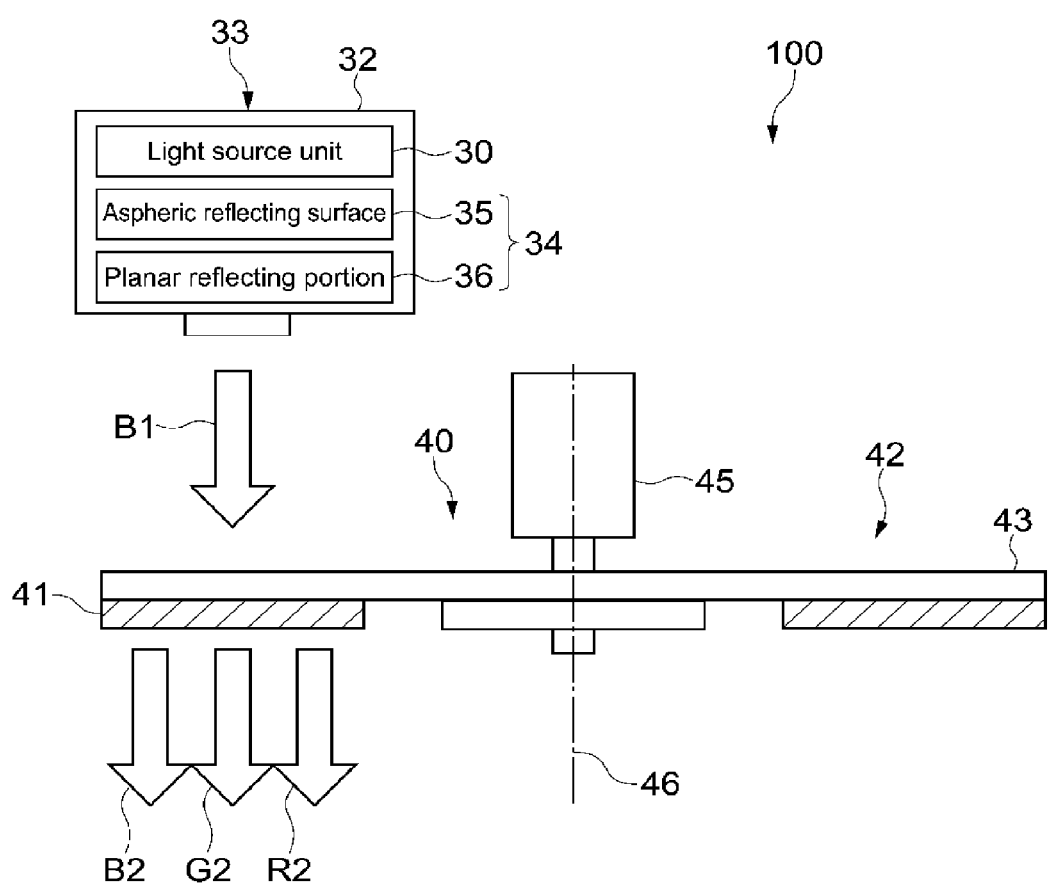
FIG. 5 is a schematic configuration view for describing light emission by the light source apparatus.

FIG. 4 is a plan view of the light source apparatus 100 shown in FIG. 3, viewed from above. In FIG. 4, illustration of the support portion 32 is omitted. FIG. 5 is a schematic configuration view for describing light emission by the light source apparatus 100.

For example, the plurality of laser light sources 31 included in the light source unit 30 is blue laser light sources capable of oscillating the blue laser light B1 having a peak wavelength of an emission intensity within the wavelength range of from 400 nm to 500 nm. Other light sources such as a light-emitting diode (LED) may be used as the solid-state light source. Further, the present disclosure may also be applied to other cases where other light sources such as mercury lamps and xenon lamps are used instead of the solid-state light source.

A light collecting optical system 34 included in the light collecting unit 33 collects the blue laser light 31, which is the output light from the plurality of laser light sources 31, onto a phosphor layer 41 of the phosphor unit 40. The light collecting optical system 34 includes an aspheric reflecting surface 35 and a planar reflecting portion 36. The aspheric reflecting surface 35 reflects and collects output light from the plurality of laser light sources 31. The planar reflecting portion 36 reflects the output light reflected by the aspheric reflecting surface 35, toward the phosphor layer 41. Thus, the blue laser light B1 output from the plurality of laser light sources 31 is collected on a predetermined point P on the phosphor layer 41 included in the phosphor unit 40. Note that the configuration of the light collecting optical system 34 is not limited to the above.

A phosphor wheel 42 shown in FIG. 5 is provided in the phosphor unit 40. The phosphor wheel 42 includes a disk-like substrate 43 and a layer of the phosphor layer 41. The substrate 43 transmits the blue laser light B1. The phosphor layer 41 is provided on the substrate 44. A motor 45 that drives the phosphor wheel 42 is connected to the center of the substrate 43. The phosphor wheel 42 has a rotating shaft 46 on a normal line passing through the center of the substrate 43 and is rotatable about the rotating shaft 46. The rotating shaft 46 is arranged at a position different from the optical axis A such that the predetermined point P of the layer 41 of the phosphor is located substantially at the center of the phosphor unit 40 (on the optical axis A).

The phosphor layer 41 contains a fluorescent substance that emits fluorescence by being excited by the blue laser light D1 having a center wavelength of about 445 nm. The phosphor layer 41 converts part of the blue laser light B1, which is output by the plurality of laser light sources 31, into light in a wavelength range including a range of from red to green wavelength range (that is, yellow light) and then outputs the resultant light. As the fluorescent substance contained in the phosphor layer 41, for example, a YAG (yttrium, aluminum, garnet)-based phosphor is used.

Further, since the phosphor layer 41 absorbs part of the excitation light and also transmits part of the excitation light, the phosphor layer 41 can output the blue laser light B1 that has been output from the plurality of laser light sources 31. Thus, the light output from the phosphor layer 41 is white light obtained by combination of the blue excitation light and the yellow fluorescence. In order to transmit part of the excitation light in such a manner, the phosphor layer 41 may contain filler particles serving as particulate substance having light transparency, for example.

By the rotation of the substrate 43 by the motor 45, the laser light sources 31 apply the excitation light to the phosphor layer 41 while relatively moving an application position on the phosphor layer 41. Thus, white light containing blue laser light B2, which has passed through the phosphor layer 41, and green light G2 and red light R2 as visible light output from the phosphor layer 41 is output as synthesized light by the phosphor unit 40.

The configuration of the light source apparatus 100 is not limited to the above; for example, a phosphor unit having a configuration different from that of FIG. 5 may be employed. Other possible configurations may be made without the phosphor unit. A light source apparatus having red laser light source for emitting red laser light, a green laser light source for emitting green laser light, and a blue laser light source for emitting blue laser light may also be employed. In this case, the laser light of three colors of RGB may be combined to generate white light.

Figure 6:
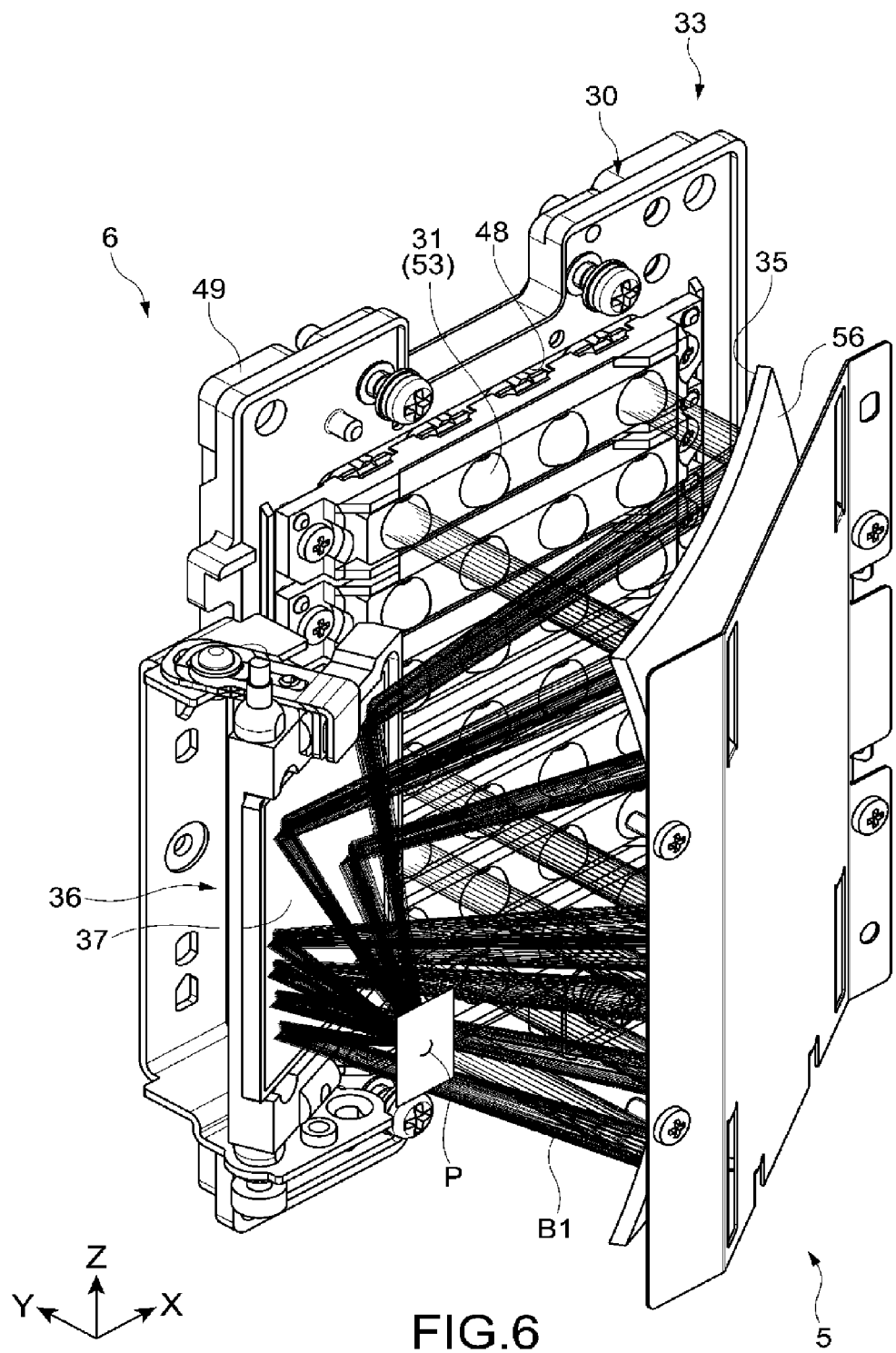
FIG. 6 is a perspective view showing a configuration example of a light collecting unit.
Figure 7:
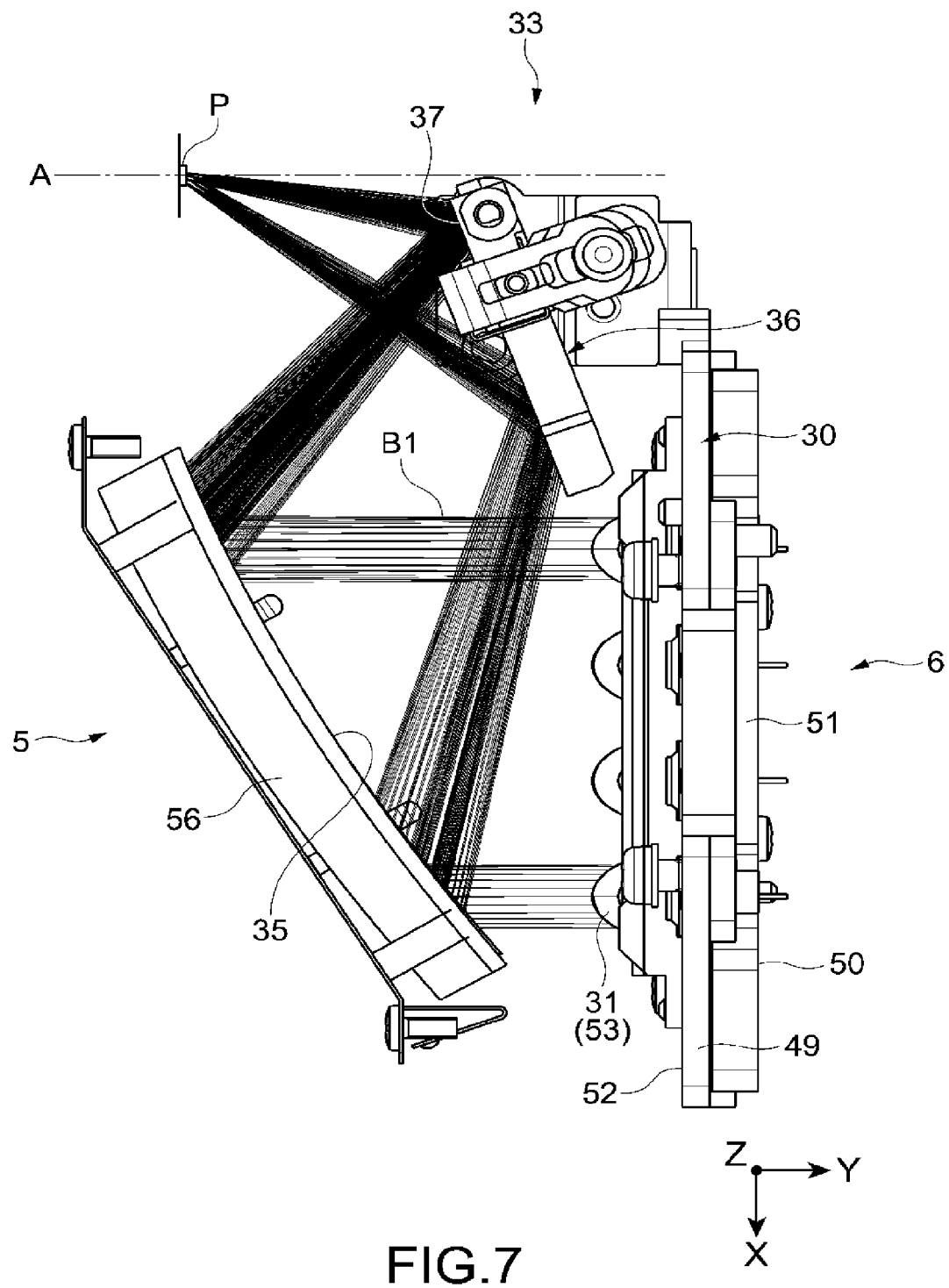
FIG. 7 is a plan view of the light collecting unit shown in FIG. 6, viewed from above.

FIG. 6 is a perspective view showing a configuration example of the light collecting unit 33. In FIG. 6, the illustration of the support portion 32 is omitted. FIG. 7 is a plan view of the light collecting unit 33 shown in FIG. 6 viewed from above.

In this embodiment, a laser light source array including 28 pieces of the laser light sources 31 is used as the light source unit 30. The light source unit 30 includes a plate-like frame 49 in which an opening 48 is formed. A mount substrate 51 (such as a printed circuit board (PCB)) onto which the plurality of laser light sources 31 is mounted is arranged on a rear surface 50 of the frame 49 (on the surface on the rear side 6). The plurality of laser light sources 31 emits the blue laser light D1 toward the front side 5 in substantially the same direction as the direction of the optical axis A, via the opening 48 of the frame 49.

On a front surface 52 of the frame 49 (on the surface on the front side 5), 28 pieces of collimator lenses 53 are arranged to correspond to the positions of the plurality of laser light sources 31. The collimator lens 53 converts the blue laser light B1 output from each laser light source 31 into a substantially parallel light flux. It should be noted that the collimator lens 53 may be described as the "laser light source 31" in the figures.

The configuration of the light source unit 30 is not limited to the above; for example, the frame 49 may not be used. The number of laser light sources 31, the arrangement thereof, the configuration of the collimator lens 53, and the like are also not limited. It should be noted that the figures show part of the light fluxes of the blue laser light B1 output from the plurality of laser light sources 31 (collimator lenses 53).

On the front side 5 of the plurality of laser light sources 31, a reflecting member 56 including the aspheric reflecting surface 35 is arranged. The aspheric reflecting surface 35 is typically a concave reflecting surface like a mirror surface, and the shape thereof is designed so as to reflect and collect the blue laser light B1 from the plurality of laser light sources 31. With this aspheric reflecting surface 35, the blue laser light B1 is reflected toward the planar reflecting portion 36.

The planar reflecting portion 36 includes a planar reflecting surface 37. The planar reflecting surface 37 reflects the blue laser light B1 reflected on the aspheric reflecting surface 35 to the predetermined point P of the phosphor layer 41. Typically, the planar reflecting surface 37 is a mirror surface. As the planar reflecting portion 36, for example, a reflective mirror is used.

Light Source Unit

Figure 8:
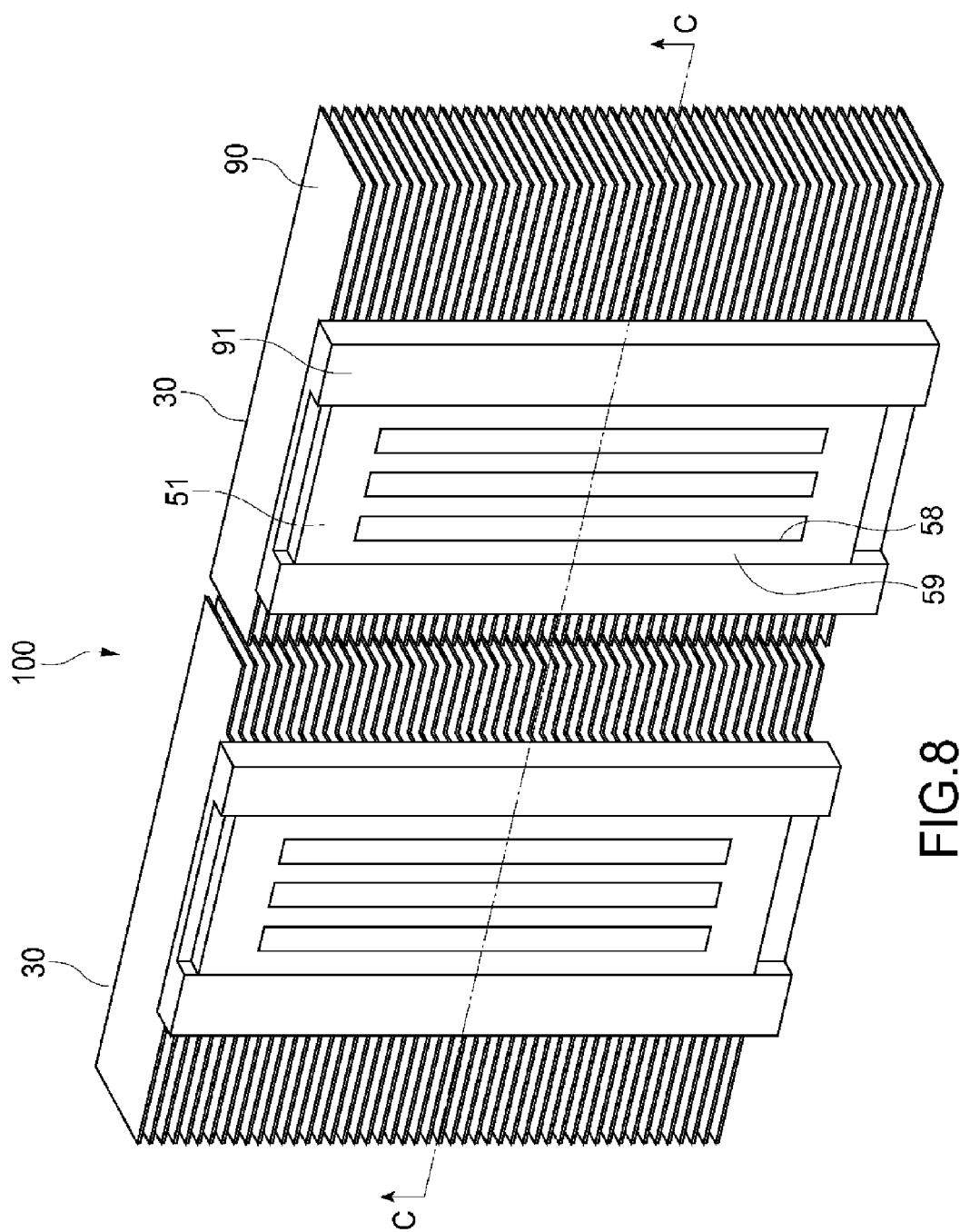
FIG. 8 schematically shows a heat sink, a connecting portion included in the heat sink, and a mount substrate attached to the connecting portion.

The light source unit 30 will be described in more detail. FIG. 8 schematically shows a heat sink 90, a connecting portion 91 included in the heat sink 90, and the mount substrate 51 attached to the connecting portion 91. Onto a side where a surface of the connecting portion 91 of the heat sink 90 is located, the frame 49, and the like, shown in FIG. 6 and the like are connected. Note that in FIG. 8, the illustration of the laser light sources 31 (collimator lenses 53) mounted on the mount substrate 51 is omitted.

Figure 9:
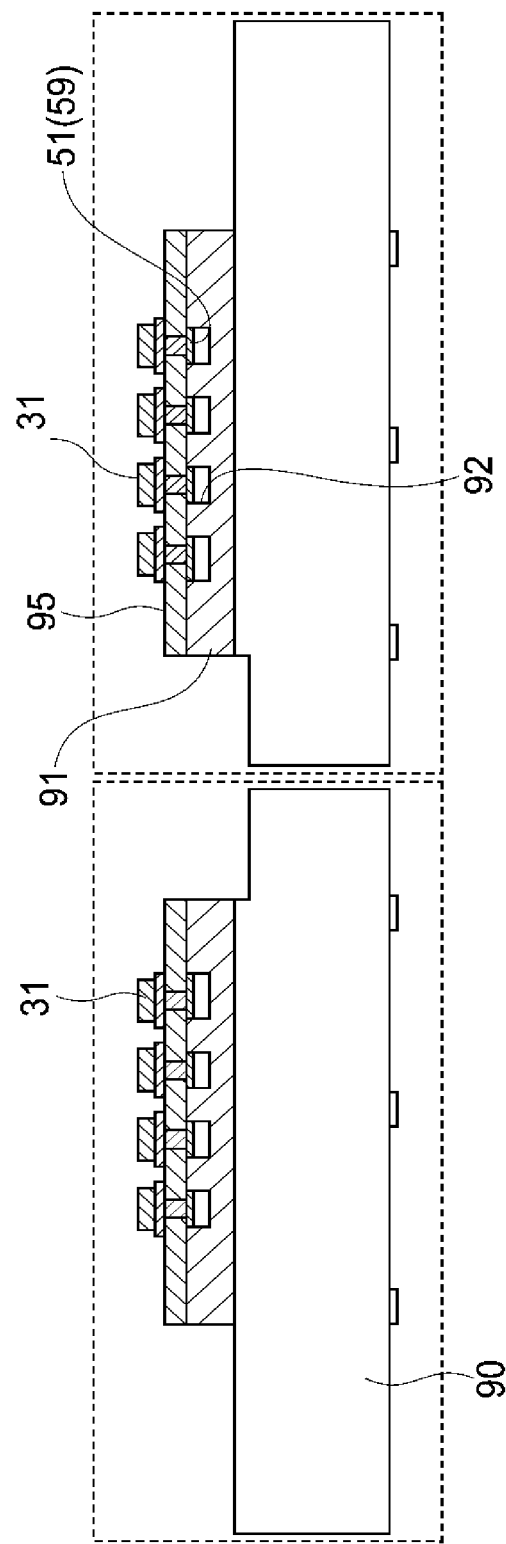
FIG. 9 is a cross-sectional view taken along the line C-C in FIG. 8.

FIG. 9 is a cross-sectional view taken along the line C-C in FIG. 8. In FIG. 9, the mount substrate 51 attached to the connecting portion 91 of the heat sink 90 and the plurality of laser light sources 31 mounted on the mount substrate 51 are illustrated. Further, in FIG. 9, a heat spreader 95 placed between the mount substrate 51 and the plurality of laser light sources 31 is also illustrated.

As shown in FIG. 9, a plurality of recesses 92 each extending in the height direction and being arranged along the horizontal direction is formed on the connecting portion 91. As shown in FIG. 8, the mount substrate 51 having a plurality of slits 58 is attached to the connecting portion 91 in such a manner that it covers the recesses 92. The mount substrate 51 is attached in such a manner that its mounting portions 59 each between the slits 58 cover the recesses 92. The heat spreader 95 is placed over the mount substrate 51; and via the heat spreader 95, the plurality of laser light sources 31 is mounted over the mounting portions 59 of the mount substrate 51.

Figure 10:
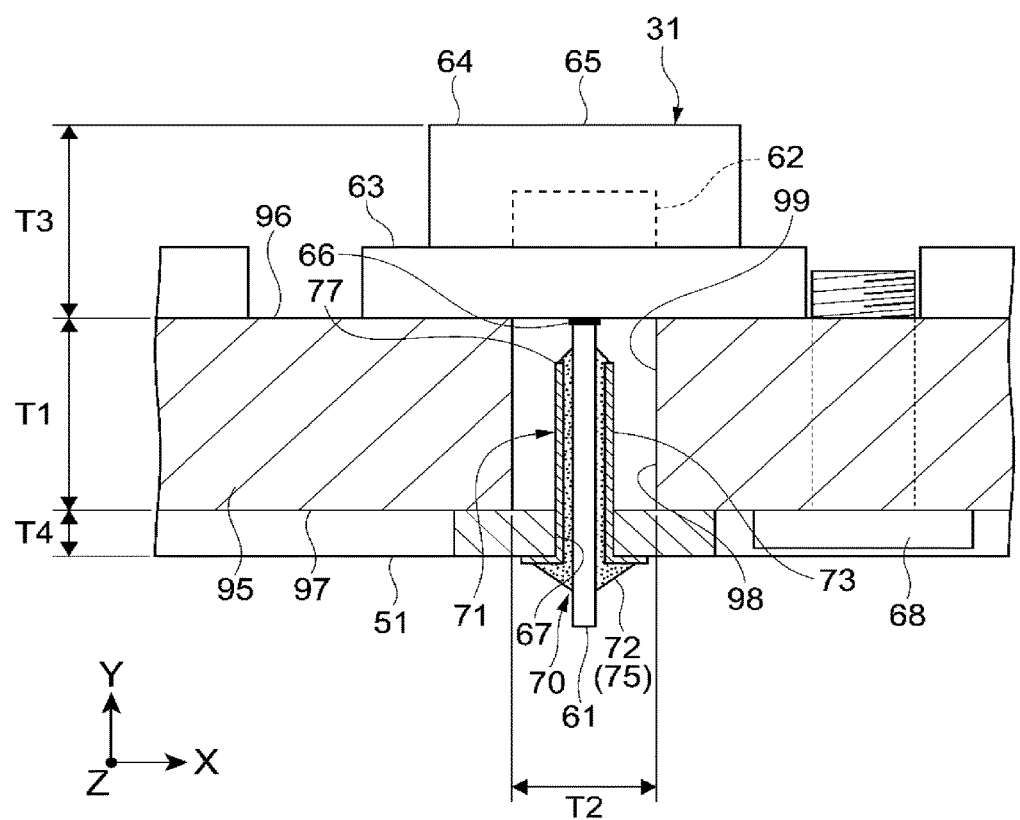
FIG. 10 is an enlarged view showing a part where a laser light source is mounted.

FIG. 10 is an enlarged view showing a part where the laser light source 31 is mounted. The laser light source 31 in this embodiment is a package-type semiconductor laser device having a lead 61, a semiconductor laser element 62 which serves as a light emitting part that emits light with a current from the lead 61, a stem 63 and a package 64. The laser element 62 is arranged on the stem 63 and is covered by the package 64 making an air-tight connection with the stem 63.

An emission area is provided in a top face 65 of the package 64. The light from the laser element 62 would be emitted through the emission area.

In this embodiment, the laser light source 31 functions as a light source part. Note that a concrete configuration of the semiconductor laser element 62 is not limited.

The stem 63 is provided with a through-hole (not shown); and the lead 61 is inserted to the through-hole. The inserted lead 61 and the laser element 62 are electrically connected to each other. A part of the bottom side of the stem 63 where the lead 61 is inserted is filled with a glass material 66, to maintain the inside of the package 64 air-tight.

Examples of materials that can be used for the stem 63 and the package 64 include a variety of metal materials such as iron, copper, and nickel-iron alloys. Examples of the glass material 66 include soda glass. Examples of materials that can be used for the lead 61 include magnetic materials such as nickel-iron soft magnetic alloys (permalloys). However, the materials of these components are not limited to the above. As will be described later, the present disclosure may make it possible to sufficiently suppress the noise or the like due to magnetostriction in the lead 61 in cases where the lead 61 is made of a magnetic material.

One lead 61 is illustrated in FIG. 10, and another lead is arranged behind the lead 61 on a page in the figure (arranged side by side in the z-axis direction). In other words, two leads are provided for one laser light source 31. However, the number of the leads is not limited thereto; and for example, it is also possible to provide three or more leads for one laser light source 31.

Although not shown in FIG. 10, a circuit pattern is formed on the mount substrate 51. The circuit pattern serves as a wiring part which is electrically connected to the lead 61 and which supplies a current to the lead 61. A given land for the circuit pattern and the lead 61 are electrically connected to each other via a through-hole 67; and thus the current is supplied to the lead 61. Materials and concrete configurations of the mount substrate 51 and the circuit pattern are not limited.

The heat spreader 95 has a first surface 96 connected to the laser light source 31, a second surface 97 connected to the mount substrate 51, and a through-hole 98 in which the lead 61 is inserted. The second surface 97 is located on a side opposite to the first surface 96. The through-hole 98 penetrates through the first surface 96 and the second surface 97. The heat spreader 95 is made of, for example, a highly heat-conductive material such as copper. The heat spreader 95 in this embodiment corresponds to a base part and functions as a heat dissipation member capable of releasing heat of the laser light source 31.

Methods of connections between the heat spreader 95 and the laser light source 31 and, between the heat spreader 95 and the mount substrate 51, are not limited. For example, as shown in FIG. 10, the laser light source 31, the heat spreader 95 and the mount substrate 51 may be mutually fixed with a screw 68.

In this embodiment, a thickness T1 of the heat spreader 95 is about 4 mm and a diameter T2 of the through-hole 98 is about 3 mm. A height T3 of the laser light source 31 connected to the first surface 96 (the height to the top face 65) is about 5 mm. A thickness T4 of the mount substrate 51 is about 1 mm. A diameter of the lead 61 inserted in the through-hole 98 is about 0.7 mm. These sizes are not limitative.

The light source unit 30 in this embodiment 30 is provided with a vibration suppression mechanism 70 as a mechanism for suppressing the noise or the like due to magnetostriction in the lead 61. The vibration suppression mechanism 70 has a vibration suppression part 71 connected to the mount substrate 51 and a fixing part 72 which fixes the lead 61 to the vibration suppression part 71. The vibration suppression part 71 has a side wall portion 73 which is inserted to the through-hole 98 of the heat spreader 95 in such a manner that the side wall portion 73 surrounds the lead 61. The fixing part 72 fixes the lead 61 to the side wall portion 73.

Figure 11:
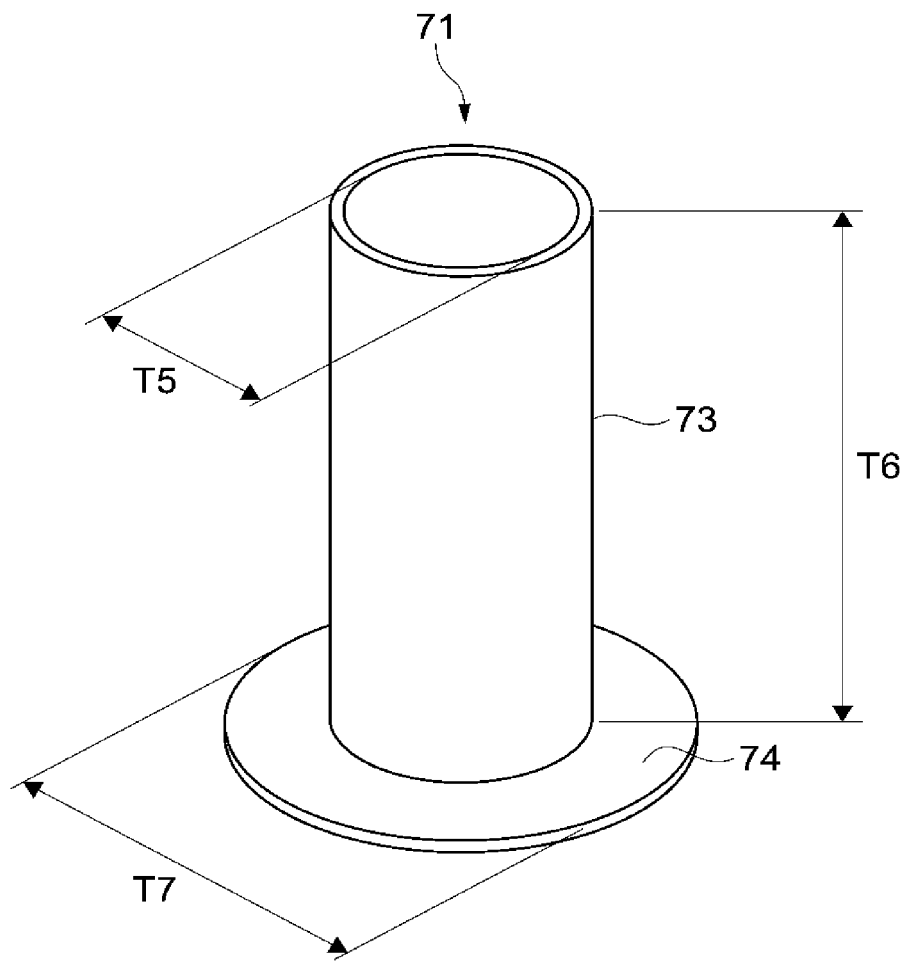
FIG. 11 is a perspective view showing a configuration example of a vibration suppression part.

FIG. 11 is a perspective view showing a configuration example of the vibration suppression part 71. The vibration suppression part 71 has the side wall portion 73 having a hollow cylindrical shape and a flange portion 74 formed on one end of the side wall portion 73. The flange portion 74 is formed coupled to the side wall portion 73.

A size of an internal space surrounded by the side wall portion 73, that is, a cross-sectional diameter T5 of the side wall portion 73, is about 1 mm. A height 16 of the side wall portion 73 is about 4 mm. A diameter T7 of the flange portion 74 is about 2.5 mm. The material of the vibration suppression part 71 is not limited; and this embodiment employs a metal material having electric conductivity such as brass (gold-plated with nickel base plating), for example. Other materials may be employed as well. It is possible to use an eyelet member as the vibration suppression part 71, for example.

A method of connection of the vibration suppression part 71 to the mount substrate 51 is not limited. In this embodiment, as shown in FIG. 10, the side wall portion 73 is fitted into the through-hole 67 formed in the mount substrate 51. This makes it possible to easily connect the vibration suppression part 71 to the mount substrate 51. When the side wall portion 73 is inserted to the through-hole 67, the flange portion 74 is made in contact with the mount substrate 51. This makes it possible to sufficiently fix the vibration suppression part 71 to the mount substrate 51. Further, the flange portion 74 may function as a stopper to prevent the vibration suppression part 71 from entering too far into the through-hole 98.

Furthermore, the side wall portion 73 is inserted to the through-hole 98 of the heat spreader 95 in such a manner that the side wall portion 73 and an inner circumferential surface 99 of the through-hole 98 are spaced from each other. The space between the side wall portion 73 and the inner circumferential surface 99 of the through-hole 98 may function as an isolated section, which may sufficiently secure electrical isolation between the heat spreader 95 and the vibration suppression part 71.

The fixing part 72 in this embodiment is a liquid fixing material provided between the lead 61 and the side wall portion 73. In this embodiment, solder 75 is used as the fixing material. By using the liquid fixing material, it becomes possible to fix the lead 61 to the side wall portion 73 easily. Note that a solid fixing material may be used as the fixing part 72.

As shown in FIG. 10, the side wall portion 73 is arranged spaced from the lead 61, at a distance by which a capillary force between the side wall portion 73 and the lead 61 can be made and be applied to the fixing material. Accordingly, when the solder 75 is provided to the flange portion 74 of the vibration suppression part 71, the solder 75 is led in between the lead 61 and the side wall portion 73 due to capillarity phenomenon. As a result, it becomes possible to sufficiently provide the solder 75, and thus to sufficiently fix the lead 61 to the side wall portion 73. The vibration suppression part 71 therefore has a function as a lead-in member.

Besides, the side wall portion 73 has the height T6 which is designed so as not to allow its tip end 77 (the end opposite from one end on which the flange portion 74 is formed) to reach the first surface 96 of the heat spreader 95. Accordingly, this makes it possible to prevent an influence on mounting of the laser light source 31 which might be made if the tip end 77 of the side wall portion 73 pressed the stem 63 of the laser light source 31.

Furthermore, with the height T6 of the side wall portion 73 being designed as mentioned above, it is possible to prevent the tip end 77 of the side wall portion 73 from coming into contact with the glass material 66, and also to prevent the solder 75 that has been led-in from coming into contact with the glass material 66. As a result, it becomes possible to sufficiently maintain the inside of the package 64 air-tight without losing the sealing effect by the glass material 66.

Incidentally, in order to prevent overrunning of the solder 75, which is a case that the solder 75 comes out of the tip end 77 of the side wall portion 73; a part having the tip end 77 may be subjected to a treatment to make it repel solder. For example, a material which repels solder may be coated in the vicinity of the tip end 77; or, the tip end 77 may be made of a material which repels solder. Examples of such materials include fluoride materials, silicon materials and the like.

The height T6 of the side wall portion 73 may be appropriately designed in a range which may allow it to prevent an influence of the side wall portion 73 and the solder on the stem 63 and the glass material 66.

Furthermore, in this embodiment, by providing the solder to the flange portion 74, it makes it possible to electrically connect the lead 61 with the circuit pattern (land) on the mount substrate 51. Therefore, in this embodiment, the electrical connection between the lead 61 and the land as well as the fixation between the lead 61 and the side wall portion 73 may be made with the solder 75. In addition, the solder 75 makes it possible to sufficiently fix the flange portion 74 to the mount substrate 51. As a result, the ease of assembly of the light source unit 30 can be increased.

An example of the assembly of the light source unit 30 will be briefly described. The laser light source 31 having the lead 61 is prepared. As described above, it is also possible to prepare a plurality of laser light sources 31 which is integrally held by a holding member or the like. The vibration suppression part 71 is mounted on the through-hole 67 of the mount substrate 51. The laser light source 31 (holding member, or the like) is connected to the first surface 96 of the heat spreader 95; and the mount substrate 51 is connected to the second surface 97. In this process, the components are connected in such a manner that the lead 61 is allowed to be inserted into the inside of the side wall portion 73. The components are mutually fixed by the screw 68 or the like; and the solder 75 is provided to the flange portion 74. Thus, it is possible to easily assemble the light source unit 30.

As described above, in the light source apparatus 100, and in the light source unit 30, according to this embodiment, the vibration suppression mechanism 70 is used; the vibration suppression mechanism 70 including the side wall portion 73 that surrounds the lead 61 and the fixing part 72 that fixes the lead 61 to the side wall portion 73. This makes it possible to suppress the noise or the like due to magnetostriction in the lead 61.

For example, in cases where a magnetic material is used as a lead, it often makes a sound by a vibration of the lead due to magnetostriction when the laser light source is driven with pulse width modulation (PWM). As a countermeasure to this, a possible way is to use continuous wave (CW) driving (constant current driving) instead of PWM driving. However, if the CW driving is used, an intensity of laser light applied to the phosphor layer 41 would change when an amount of current is changed in order to change the luminance of the output light. This may result in an occurrence of change in colors of the finally obtained light that has passed through the phosphor layer 41.

Another possible way is to reduce the thickness of the heat spreader to be used and make a vibrating part of the lead shorter so that the sound generated by magnetostriction can be shifted to a frequency band which may be hardly heard by a human. Examples of frequency bands which may be hardly heard by a human include those of a high-frequency side of an audible frequency range, and those out of the audible frequency range. As a result of a test carried out by the applicant, the frequency of the sound generated by magnetostriction was successfully shifted from 9600 Hz to 12800 Hz when the thickness of the heat spreader was changed from 4 mm to 3 mm. As a result, the noise level was reduced from +25 dB to +14 dB. However, with the reduced thickness of the heat spreader, it becomes difficult to prevent an influence of heat, because it lowers the performance of the heat spreader of releasing heat produced by the laser light source. For example, the life of the laser light source would be shortened.

To such problems, the vibration suppression mechanism 70 according to the present disclosure may be effective. Specifically, by providing the vibration suppression part 71 at the mount substrate 51, allowing the lead 61 to pass through the inside of the side wall portion 73 and filling this part of the side wall portion 73 with the solder 75; it makes it possible to more securely fix the lead 61 that might vibrate, and also to thicken a part which might cause the vibration by magnetostriction. As a result, the vibration of the lead 61 can be suppressed.

Moreover, this may make a part of the lead which is sticking out of the tip end 77 of the side wall portion 73 shorter, while this part of the lead with no solder 75 might have easily caused the vibration. Accordingly, this makes it possible to produce the same effect as that produced by reducing the thickness of the heat spreader which has been described above. In other words, this makes it possible to shift the frequency of the sound generated by magnetostriction to a higher frequency band, and thus to reduce the noise level.

In addition, the vibration suppression part 71 can be attached to the mount substrate by an automatic machine or the like; so this can increase the ease of assembly of the light source unit 30.

Other Embodiments

The present disclosure is not limited to the embodiment described above and can achieve other various embodiments.

FIGS. 12A to 12C, 13A and 13B show configuration examples of vibration suppression parts of other embodiments. In the examples shown in FIGS. 12A to 12C, the following configurations are employed in order to increase the capillary force applied to the solder that functions as the fixing part.

Figure 12C:
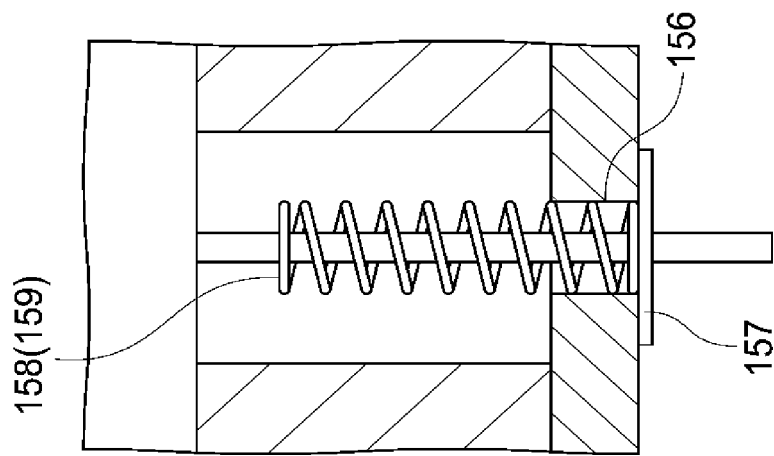
FIGS. 12A to 12C show configuration examples of vibration suppression parts of other embodiments.
Figure 12B:
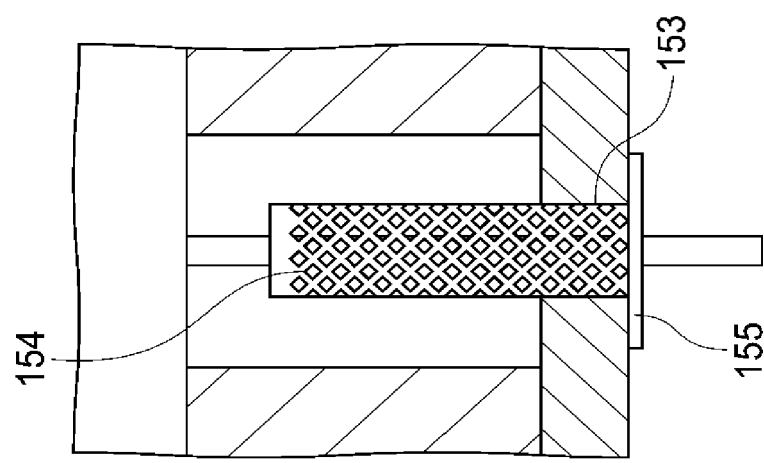
Figure 12A:
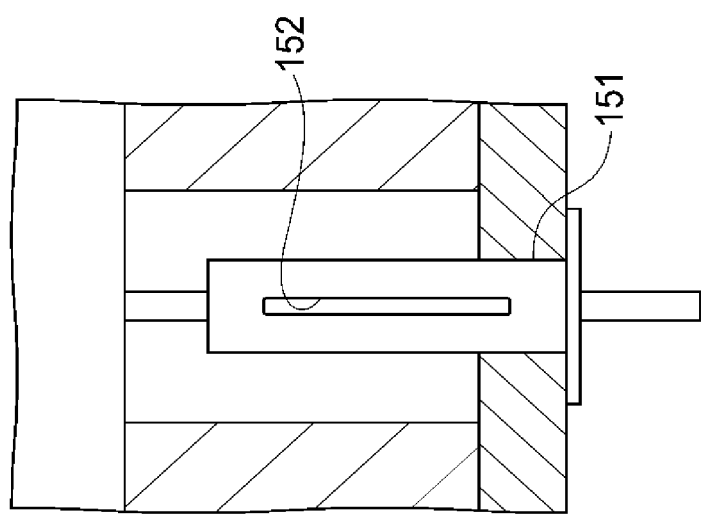

A side wall portion 151 shown in FIG. 12A has at least one opening 152. The number of openings 152, and size, shape, position of formation of the opening 152 and the like are not limited. As an example, the opening 152 may be formed exclusively at a part where it is intended to allow the capillary force to be increased. With the formation of the opening 152, a specific surface area of the side wall portion 151 becomes increased and thus the capillarity phenomenon can be facilitated.

A side wall portion 153 shown in FIG. 12B has a meshed portion 154. The meshed portion is a part formed in a mesh-like structure. The meshed portion 154 may be formed all over the side wall portion 153, or may be formed in a part of the side wall portion 153. Accordingly, the meshed portion 154 may also be formed exclusively at a part where it is intended to allow the capillary force to be increased. An example of a possible configuration thereof is one in which the meshed portion 154 is formed exclusively at a part relatively nearer a flange portion 155, in the side wall portion 153.

The meshed portion 154 may also be formed by a plurality of rectangular openings arranged in an oblique direction. Alternatively, it is also possible to form the meshed portion 154 by forming an opening in the side wall portion 153 and fitting a meshed member to this opening. Note that the size of mesh is not limited.

A side wall portion 156 shown in FIG. 12C has a coiled shape. Specifically, the side wall portion 156 has a flange portion 157 and a coiled portion 158 coupled to the flange portion 157. The coiled portion 158 may be formed by bending a linear rod-like member in a helical fashion. A thickness of the coiled portion 158 and the number of turns of the coiled portion 158 are not limited. By forming the meshed portion 154 or the coiled portion 158, it may make it possible to facilitate the capillarity phenomenon.

Figure 13A:
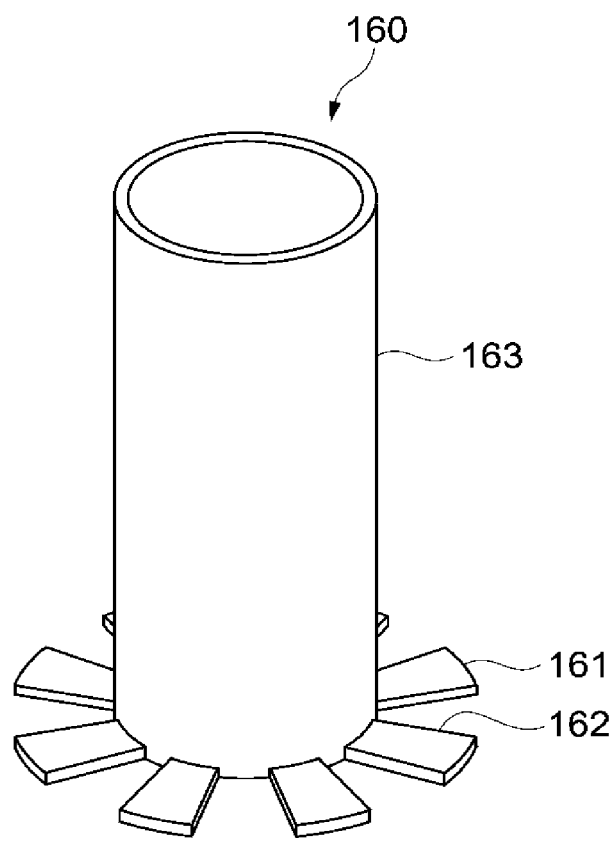
FIGS. 13A and 13B show configuration examples of vibration suppression parts of other embodiments.

In a vibration suppression part 160 shown in FIG. 13A, notches 162 are formed in a flange portion 161. The notches 162 are formed in a shape in which the notches 162 radiate out from the center of the flange portion 161 (the center of the space surrounded by a side wall portion 163). The number of the notches 162 and the shape thereof are not limited, and it is also possible to form at least one opening instead of the notches 162. By forming the notches 162 or the opening in the flange portion 161, it would allow the solder provided on the flange portion 161 to form a solder fillet 76 by also involving a land of a mount substrate. As a result, the land and the lead 61 can be electrically connected reliably.

Figure 14:
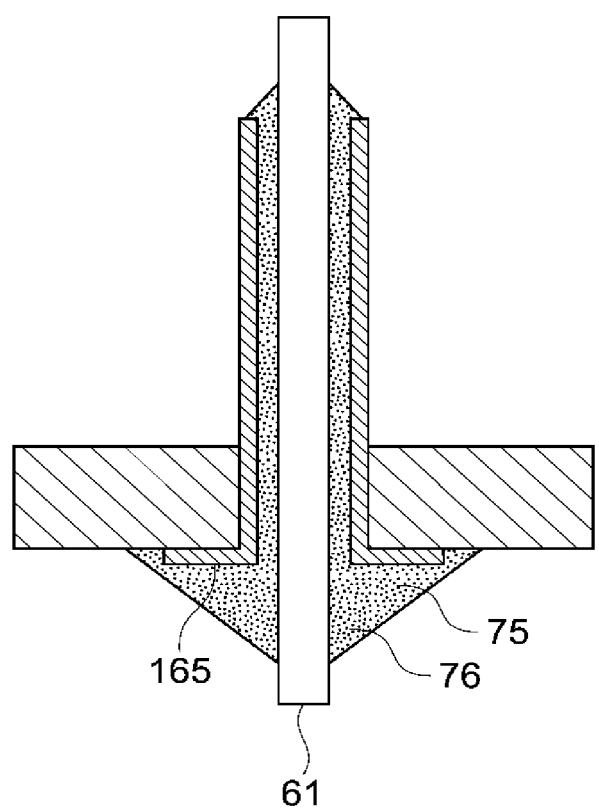
FIG. 14 schematically describes an example of a method of supplying a solder.

Incidentally, as shown in FIG. 14, the solder 75 may be provided to a larger area than an area in which a flange portion 165 exists. This may allow formation of the solder fillet 76 by also involving the land; and thus, the land and the lead 61 can be electrically connected reliably.

Figure 13B:
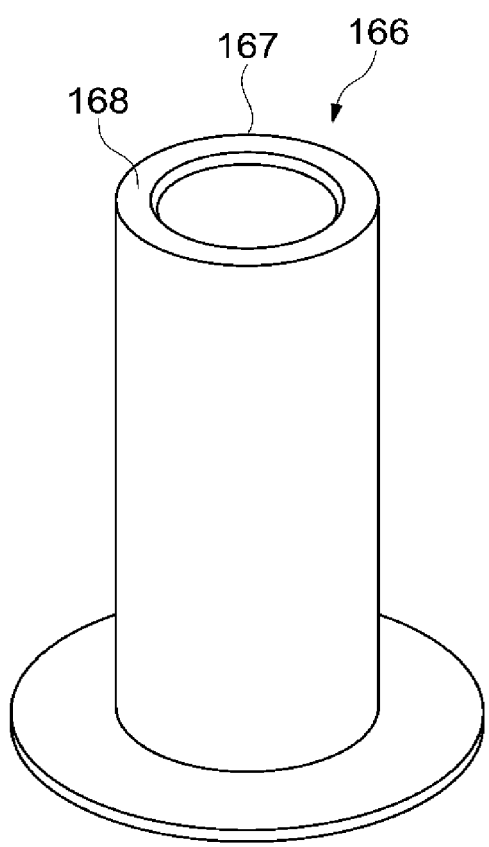

In a vibration suppression part 166 shown in FIG. 13B, a fold-back portion 168 is formed in its tip end 167. With the fold-back portion 168, it becomes possible to sufficiently prevent overrunning of solder. As a matter of course, on the fold-back portion 168, a material which repels solder may be coated. In addition, it is also possible to employ a vibration suppression part without any flange portion. In such cases, it becomes possible to simplify the configuration of the vibration suppression part, and to reduce material costs.

Figure 15A:
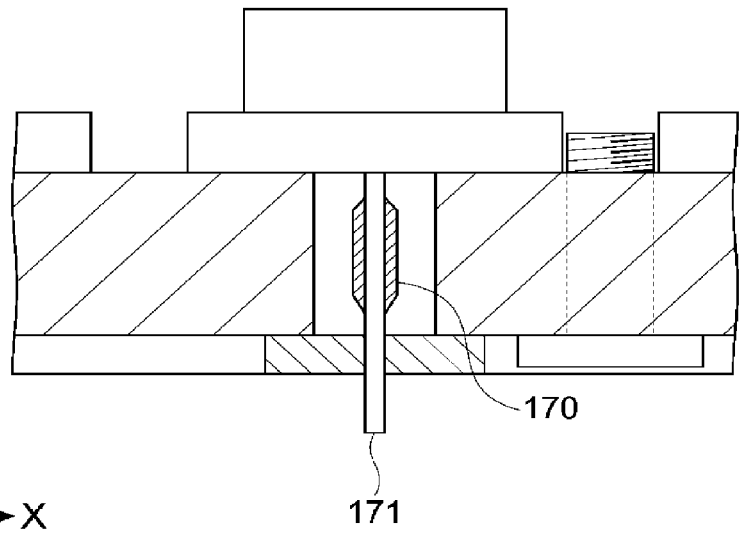
FIGS. 15A and 15B show other configuration examples for suppressing noise or the like caused by magnetostriction in a lead.
Figure 15B:
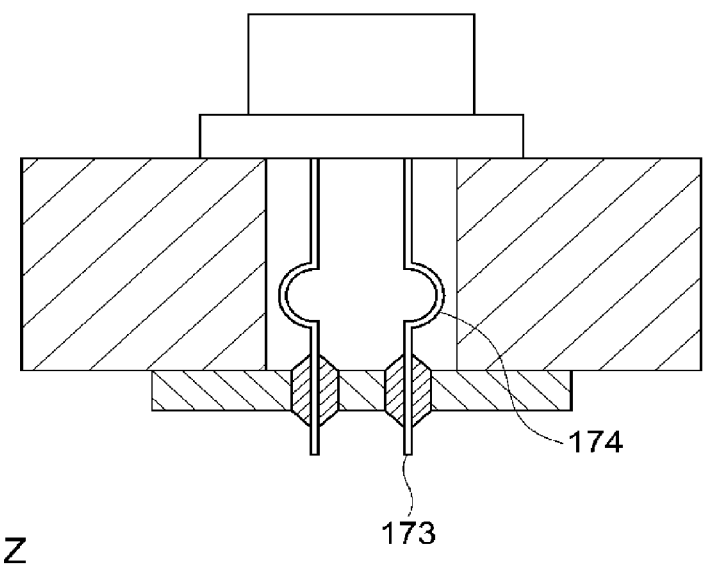

FIGS. 15A and 15B show other configuration examples for suppressing noise or the like caused by magnetostriction in a lead. As shown in FIG. 15A, a fixing member 170 may be directly provided on a lead 171. For example, an adhesive such as a room-temperature-curable (RTV) rubber may be provided as the fixing member 170. Or, a component such as a heat-shrinkable material, a clip and a tube may be attached to the lead 171. The materials thereof are not limited; and for example, a resin clip or tube may be separately formed and may be attached to the lead 171. By using such a fixing member 170, it becomes possible to suppress the vibration of the lead 171, and to shift the frequency of the sound generated by magnetostriction.

As shown in FIG. 15B, a bent portion 174 may be formed in a lead 173. The bent portion 174 may be formed by bending at least a part of a linear lead. In an example shown in FIG. 15D, two leads 173 have their respective bent portions 174 formed in a semicircular shape facing each other. The illustration in FIG. 15B is shown as viewed from a 90-degree rotated direction. The number of bent portions 174, and size, shape, position of formation of the bent portion 174 and the like are not limited. With the formation of the bent portion 174, a vibration mode of the lead 173 may be changed and thus the noise or the like due to the vibration can be reduced.

It may need a process of attaching the fixing member to the lead, or a process of bending the lead, to have the configurations shown in FIGS. 15A and 15B. Accordingly, the assembly may become difficult if a plurality of laser light sources is to be used. In contrast, with the configurations using the vibration suppression mechanism 70 shown in FIG. 10 and the like, it becomes possible to easily assemble the light source units 30; by connecting the vibration suppression parts 71 to the respective mount substrates 51, of the same number as the number of laser light sources 31. It therefore makes it possible to provide increased ease of assembly when a plurality of laser light sources is to be used.

In the image display apparatus 500 shown in FIG. 1, the lighting optical system 220 formed of a transmissive liquid crystal panel is described. However, the lighting optical system can also be formed of a reflective liquid crystal panel. A digital micro-mirror device (DMD) and the like may be used as the image generation element. Additionally, a polarization beam splitter (PBS), a color combining prism that combines video signals of colors of RGB, a total internal reflection (TIR) prism, and the like may be used instead of the dichroic prism 340.

Further, in the embodiment described above, an apparatus other than the projector may be formed as the image display apparatus according to the embodiment of the present disclosure. In addition, the light source apparatus according to the embodiment of the present disclosure may be used for an apparatus other than the image display apparatus.

At least two of feature points of the embodiments described above may be combined. In other words, various feature points contained in the embodiments may be combined in any way regardless of differences between the embodiments. The effects described herein are non-limitative examples; and embodiments of the present disclosure may also have additional effects.

It should be noted that the present disclosure can have the following configurations.

(1) A light source apparatus, including:
a light source part having a lead and a light emitting part configured to emit light with a current from the lead;
a substrate having a wiring part electrically connected to the lead, the wiring part being configured to supply a current to the lead;
a base part having
  a first surface connected to the light source part,
  a second surface connected to the substrate, the second surface being located on a side opposite to the first surface, and
  a through-hole penetrating through the first surface and the second surface, in which the lead is inserted; and
a vibration suppression mechanism including
  a vibration suppression part having a side wall portion inserted to the through-hole in such a manner that the side wall portion surrounds the lead, the vibration suppression part being connected to the substrate, and a fixing part configured to fix the lead to the side wall portion.

(2) The light source apparatus according to (1), in which the fixing part includes a liquid fixing material provided between the lead and the side wall portion.

(3) The light source apparatus according to (2), in which the side wall portion is arranged in such a manner that a capillary force between the side wall portion and the lead can be applied to the fixing material.

(4) The light source apparatus according to (3), in which the side wall portion has at least one opening.

(5) The light source apparatus according to (3), in which the side wall portion has a meshed portion.

(6) The light source apparatus according to (3), in which the side wall portion has a coiled shape.

(7) The light source apparatus according to any one of (1) to (6), in which the side wall portion is inserted to the through-hole in such a manner that the side wall portion and an inner circumferential surface of the through-hole are spaced from each other.

(8) The light source apparatus according to any one of (2) to (7), in which the fixing material electrically connects the lead and the wiring part.

(9) The light source apparatus according to any one of (1) to (8), in which the vibration suppression part has a flange portion coupled to the side wall portion, the flange portion being made in contact with the substrate.

(10) The light source apparatus according to (9), in which the fixing material fixes the flange portion onto the substrate.

(11) The light source apparatus according to any one of (2) to (10), in which the fixing material includes a solder.

(12) The light source apparatus according to any one of (1) to (11), in which the base part includes a heat dissipation member capable of releasing heat of the light source part.

It should be understood by those skilled in the art that various modifications, combinations, sub-combinations and alterations may occur depending on design requirements and other factors insofar as they are within the scope of the appended claims or the equivalents thereof.

What is claimed is:

1. A light source apparatus, comprising:
a light source part having a lead and a light emitting part configured to emit light with a current from the lead;
a substrate having a wiring part electrically connected to the lead, the wiring part being configured to supply a current to the lead;
a base part having
a first surface connected to the light source part,
a second surface connected to the substrate, the second surface being located on a side opposite to the first surface, and
a through-hole penetrating through the first surface and the second surface, in which the lead is inserted; and
a vibration suppression mechanism including
a vibration suppression part having a side wall portion inserted into the through-hole such that the side wall portion surrounds the lead, the vibration suppression part being connected to the substrate, and
a fixing part configured to fix the lead to the side wall portion, wherein
a portion of the side wall portion is disposed between the base part and a portion of the fixing part.

2. The light source apparatus according to claim 1, wherein
the fixing part includes a fixing material provided between the lead and the side wall portion.

3. The light source apparatus according to claim 2, wherein
the side wall portion is arranged such that a capillary force between the side wall portion and the lead is applied to the fixing material when in liquid form.

4. The light source apparatus according to claim 3, wherein
the side wall portion is a coil.

5. The light source apparatus according to claim 1, wherein
the side wall portion is inserted into the through-hole such that the side wall portion and an inner circumferential surface of the through-hole are spaced from each other.

6. The light source apparatus according to claim 2, wherein
the fixing material electrically connects the lead and the wiring part.

7. The light source apparatus according to claim 1, wherein
the vibration suppression part has a flange portion coupled to the side wall portion, the flange portion being in contact with the substrate.

8. The light source apparatus according to claim 3, wherein
the side wall portion has a meshed portion.

9. The light source apparatus according to claim 7, wherein
the fixing material fixes the flange portion onto the substrate.

10. The light source apparatus according to claim 2, wherein
the fixing material includes a solder.

11. The light source apparatus according to claim 3, wherein
the side wall portion has at least one opening.

12. The light source apparatus according to claim 1, wherein
the base part includes a heat dissipation member configured to release heat of the light source part.

13. The light source apparatus according to claim 1, wherein the portion of the fixing part is disposed between the lead and the side wall portion.

14. The light source apparatus according to claim 1, wherein the entire surface of the side wall portion that faces an inner circumferential surface of the through-hole is separated from the inner circumferential surface of the through-hole by a space.

15. A light source unit, comprising:
a light source part having a lead and a light emitting part configured to emit light with a current from the lead;
a substrate having a wiring part electrically connected to the lead, the wiring part being configured to supply a current to the lead;
a base part having
a first surface connected to the light source part,
a second surface connected to the substrate, the second surface being located on a side opposite to the first surface, and a through-hole penetrating through the first surface and the second surface, in which the lead is inserted; and a vibration suppression mechanism including a vibration suppression part having a side wall portion inserted into the through-hole such that the side wall portion surrounds the lead, the vibration suppression part being connected to the substrate, and a fixing part configured to fix the lead to the side wall portion, wherein a portion of the side wall portion is disposed between the base part and a portion of the fixing part.

16. An image display apparatus, comprising:

a light source apparatus including a light source part having a lead and a light emitting part configured to emit light with a current from the lead, a substrate having a wiring part electrically connected to the lead, the wiring part being configured to supply a current to the lead, a base part having a first surface connected to the light source part, a second surface connected to the substrate, the second surface being located on a side opposite to the first surface, and a through-hole penetrating through the first surface and the second surface, in which the lead is inserted, and a vibration suppression mechanism including a vibration suppression part having a side wall portion inserted into the through-hole such that the side wall portion surrounds the lead, the vibration suppression part being connected to the substrate, and a fixing part configured to fix the lead to the side wall portion;

an image generation system including an image generation element configured to generate an image based on applied light, and a lighting optical system configured to apply the light from the light source apparatus to the image generation element; and a projection lens configured to project the image generated by the image generation element, wherein a portion of the side wall portion is disposed between the base part and a portion of the fixing part.

* * * * *